United States Patent [19]

Dodwell et al.

[11] Patent Number: 5,053,139
[45] Date of Patent: Oct. 1, 1991

[54] REMOVAL OF HEAVY METALS, ESPECIALLY LEAD, FROM AQUEOUS SYSTEMS CONTAINING COMPETING IONS UTILIZING AMORPHOUS TIN AND TITANIUM SILICATES

[75] Inventors: Glenn W. Dodwell, Tinton Falls; BethAnn Smith, Edison, both of N.J.

[73] Assignee: Engelhard Corporation, Iselin, N.J.

[21] Appl. No.: 625,731

[22] Filed: Dec. 4, 1990

[51] Int. Cl.$^5$ .................................................. C02F 1/28
[52] U.S. Cl. ..................................... 210/688; 210/912; 210/913; 210/914
[58] Field of Search ............... 210/679, 688, 912, 913, 210/914

[56] References Cited

U.S. PATENT DOCUMENTS

| | | | |
|---|---|---|---|
| 2,653,089 | 9/1953 | Brooke | 210/688 |
| 4,711,718 | 12/1987 | Nelson, Jr. | 210/688 |
| 4,746,439 | 5/1988 | Newman | 210/688 |
| 4,994,191 | 2/1991 | Kuznicki et al. | 210/688 |

Primary Examiner—Stanley S. Silverman
Assistant Examiner—Krisanne Shideler

[57] ABSTRACT

A process for the removal of heavy metals such as lead, cadmium, zinc, chromium, arsenic and mercury from aqueous solutions containing one or more of said metals as well as competing ions such as calcium and/or magnesium by contacting said aqueous solution with amorphous titanium or tin silicates is disclosed. Said amorphous titanium and tin silicates are characterized by a silicon-to-titanium or tin molar ratio of from 1:4 to 1.9:1 and a cumulative desorption pore volume ranging from about 0.03 to about 0.25 cubic centimeters per gram.

10 Claims, 2 Drawing Sheets

REMOVAL OF HEAVY METALS, ESPECIALLY LEAD, FROM AQUEOUS SYSTEMS CONTAINING COMPETING IONS UTILIZING AMORPHOUS TIN AND TITANIUM SILICATES

BACKGROUND OF THE INVENTION

The use of ion exchangers, both organic and inorganic, including crystalline molecular sieve zeolites, in order to remove certain metals from aqueous solutions is notoriously old in the art and the patent and technical literature contains many examples of such techniques. Although molecular sieves generally are effective for the removal of certain cations, nevertheless, when competing cations are present in the aqueous solution, a molecular sieve will function normally to the point at which the metal which is desirous of being removed effectively occupies some portion of the ionic sites in said zeolite. Thereafter, the zeolite must either be discarded or regenerated.

A very practical use for the above type of operation is in the home water softening industry wherein an ion exchanger of the organic or inorganic type is contacted with water until the calcium and magnesium ions which are inherently present in most mineral water replaces the ion originally associated with the ion exchanger, usually sodium. At this point, the ion exchanger has to be regenerated and this is usually accomplished by back-washing, or back-flushing, or otherwise contacting the ion exchanger with a solution of a different cation than that which was removed from the water, i.e., usually sodium in the form of sodium chloride. The sodium exchanges for the calcium/magnesium in the spent ion exchanger and the cycle is ready to start anew.

In evaluating the properties of a suitable ion exchanger, it is quite obvious that the environment in which it works to remove the unwanted metal or metals is of extreme importance and its susceptibility to competing ions is of paramount importance in obtaining a practical exchanger as opposed to one that is merely a scientific curiosity.

Thus, for example, in industrial processes wherein heavy metals are present in contaminated aqueous solutions, such heavy metals are not ordinarily present by themselves because the water contains other ions, particularly calcium and magnesium. Thus for an ion exchanger to be practical in the contact of industrial waste streams containing heavy metals, it is necessary that the ion exchanger be sufficiently selective towards heavy metals versus magnesium or calcium which compete for its ion exchange sites.

Another significant area where ion exchangers can be utilized is in the field of drinking water. The contamination of drinking water by toxic heavy metals, especially lead, has become a topic of great interest in both the scientific and popular press.

The Environmental Protection Agency (EPA) has stated that there is no threshold level of lead below which water is considered safe for human consumption. The EPA estimates that 138 million residents in the United States are potentially at risk from some degree of lead poisoning. Recognizing this problem, the National Sanitation Foundation (NSF) has established a Standard No. 53 which it recommends for adoption by the NSF Council of Public Health Consultants. Standard No. 53 sets a limit of no more than 20 parts per billion (20 ppb) of lead.

Sources of lead contamination include industrial waste as well as lead-bearing solders and other components found in the plumbing of most homes and water coolers.

There are various techniques utilized for the removal of lead, such as precipitation techniques. Such processes while effective in bulk removal are ineffective in reducing lead levels below about 50 ppb, an unacceptable level for human consumption. Other potential options for lead removal include purification of contaminated streams by exposure to synthetic ion exchange resins or various absorbents such as activated carbon. These systems typically suffer from low dynamic metal capacities, low lead selectivities and unacceptably slow rates of metal removal.

Cation exchange represents one potential avenue for the removal of many cationic metal species from aqueous systems. As indicated earlier, crystalline inorganic molecular sieves form the basis of hundreds of commercial ion exchange processes. Each individual molecular sieve demonstrates characteristic preferences of selectivities towards certain counterbalancing ions when exposed to mixed solutions and, thus, the separation or isolation of certain cations may be accomplished by the exposure to mixed cationic solutions to specifically tailored molecular sieves.

There are many types of devices used commercially for treating drinking water and they can generally be classified as under-the-tap, under-the-counter, whole-house treating systems. As the name implies, the under-the-tap device is one that is merely attached to the faucet or tap, the under-the-counter device is placed underneath the sink and the whole-house device is usually located in some central place, like the basement, wherein the entire water supply which enters the house is treated prior to it being distributed.

The three devices generally differ from each other in size. The under-the-tap device has a limited amount of space where the under-the-counter device has more space, and a whole-house treating system has the most space.

The under-the-tap and the under-the-counter devices usually contain a chamber which is occupied in part by activated carbon in order to remove organics from the drinking water and a limited amount of space for the inclusion of an ion exchanger. Quite obviously, the more effective the ion exchanger is, the less space it has to occupy and, correspondingly, more space can be occupied by activated carbon. Thus, the most stringent demands on an ion exchanger is for an under-the-faucet or under-the-tap application and, if an ion exchanger will function under these drastic conditions, then quite obviously it will also function in an under-the-counter device or larger devices which treat the entire water supply of the home.

In order to have the material for use as an ion exchanger in said under-the-faucet drinking water application, many problems must be overcome. The material must be able to remove lead from tap water to a level not greater than 20 ppb and to accomplish this in the presence of competing ions normally found in tap water. In order to be effective, the exchanger must have an extremely rapid rate of lead removal since the contact time in such an environment is extremely short. Additionally, because of the fact that most under-the-tap devices only allow a small amount of room or space which exchanger can occupy, this poses further restraint. Obviously, the rate of lead removal must be extremely high to meet the 20 ppb target. If more room were allowed for an ion exchanger, for example in an under-the-counter system, its rate though high could be less. However, as has been previously pointed out, it is still desirable to use an ion exchanger with an extremely high rate of lead removal even in an under-the-counter device since less of the material would be needed.

In addition to rapid lead removal, the exchanger must be able to retain the metal contaminants removed without causing what is referred to in the art as "avalanching." As is known in the art, when an exchanger removes a metal ion or ions from tap water, they gradually built up or accumulate on the ion exchanger so that the concentration in or on the ion exchanger is greater than the concentration of said ion or ions in the drinking water. If the ion exchanger suddenly releases such ions into the drinking water, a condition occurs when the drinking water has more contaminants than originally present in the untreated tap water. This is referred to as avalanching and, quite obviously, it must be avoided since it poses a significant health hazard.

It is to be understood that given enough time, all ion exchangers will avalanche or exhaust their capacity to absorb metal ions. However, since devices for treating drinking water, particularly under-the-tap and under-the-counter devices, generally contain activated carbon to remove organics which must be replaced at regular intervals, an ion exchanger must not avalanche or exhaust its capacity until significantly past the time when the activated carbon must be replaced. Thus, the life of the activated carbon becomes the limiting factor and not the ion exchanger.

It has now been discovered that certain amorphous titanium and tin silicate gels demonstrate remarkable rates of uptake for heavy metal species such as lead, cadmium, zinc, chromium and mercury which are an order of magnitude greater than that of prior art absorbents or ion exchangers under the conditions tested which include the presence of competing ions such as calcium and magnesium. The combination of extraordinary lead selectives, capacity and uptake rates, allows such materials to strip lead from aqueous streams with minimal contact time allowing direct end use in filters for water purification, be it under-the-counter or under-the-faucet, or whole-house devices.

DESCRIPTION OF THE INVENTION

Figure 1:
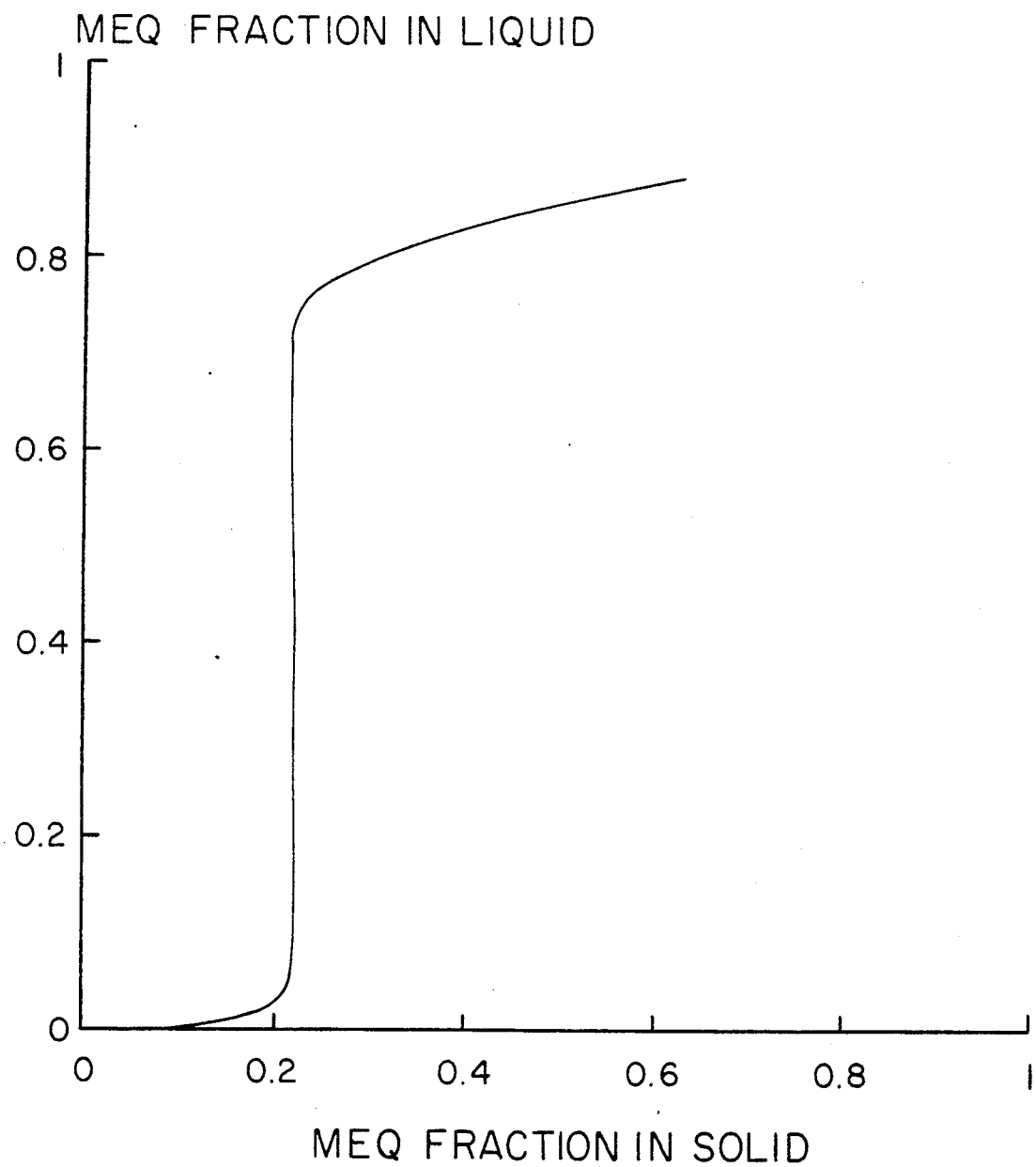
FIG. 1 is a plot showing the effective capacity for a commercially available ion exchanger for lead.

It has now been found that certain amorphous titanium silicate and tin silicate gels are admirably suited to remove lead from drinking water in the presence of competing ions normally found in said drinking water.

Although silicate gels have long been known in the art to be useful for a wide variety of applications including ion exchangers, there has been no recognition that certain silicate gels were so unusual that they could effectively remove lead at an extremely high rate.

The amorphous silicate gels useful in the novel process of this invention are tin or titanium silicates which contain a silicon-to-titanium or tin ratio of from 1:4 to 1.9:1. It is preferred to use gels having a silicon-to-titanium or tin ratio of 1:3 to 1.5:1.

However, it is to be immediately understood that although the above characterization is accurate in defining the properties which the gels of this invention must possess, it is incomplete. In other words, there are amorphous titanium or tin silicate gels having the above cited ratios which do not possess the rapid rate of lead removal whereas there are others which do.

In general, the titanium or tin silicates which are operable in the novel process of this invention have cumulative desorption pore volumes in cubic centimeters per gram ranging from about 0.03 to about 0.25. Cumulative desorption pore volume is determined by the method set forth in the Appendix.

For reasons which are not completely understood, it has been discovered that ion exchangers having extraordinary selectivity, capacity and rate of exchange can be prepared by precipitating hydrous metal oxides wherein the molarity of the silicate solution ranges from .05 molar to 1.4 molar and the molarity of the titanium or tin solution ranges from .3 molar to about 3.5 molar. It is preferred that the molarity of the tin or titanium solution as well as the silicate solution be 0.3 to 0.75 molar.

The titanium or tin silicate gels useful in the novel process of this invention are prepared by merely contacting a solution of a soluble titanium or tin salt, such as the chloride, the bromide, the oxychloride, etc. with a sodium silicate solution and sufficient alkali with vigorous stirring.

The pH of the solution should fall between 4 and 9, and preferably between 7 and 8, and if this is not the case, the pH is adjusted with dilute HCl or any other acid or dilute sodium hydroxide. The sample is allowed to age for at least one day but no more than four days, followed by washing, drying. It is usually dried at about 70° for 24 to 48 hours, although the drying temperature and time are not critical.

The gel can be used as made, which is usually in its sodium form, or in other alkali or alkaline earth metal forms, as well as in its hydrogen form. Quite obviously, the calcium form is preferred for drinking water operations.

The following examples will illustrate the novel process of this invention.

In Examples 1 to 11 which follow, the following test procedure was used.

Twenty-five Gallon Lead Test Procedure

A 150 ppb lead solution is made in a 25-gallon polypropylene graduated tank by diluting 141 9 grams of 100 ppm lead nitrate solution to 25 gallons with tap water containing approximately 50 ppm Ca, 10 ppm Mg and 25 ppm Na. The tank is stirred constantly to assure a homogeneous solution, and the temperature is kept between 68°–70° F.

Twenty-five cc's of −20/+60 mesh ion exchange material particles were measured utilizing a graduated cylinder and then weighed. The 25 cc sample is then placed into a beaker to which 150 cc's of deionized water is added, the pH is then measured. The water is decanted off, and the sample is then loaded into the ion exchange column. The plexiglass column is seven inches in length, has an O.D. of 1¾ inches and an I.D. of 1¼ inches. The bed depth is approximately 4 cm. The flow and pressure are set using deionized water. Once the flow is set at 1 liter per minute and the pressure has stabilized at 16–20 psi, the switch from deionized water to the 150 ppb lead solution is made.

Samples of the effluent are taken at 5, 20, 40, 60 and 90 minutes. The lead concentration of the effluent samples is measured using the HACH Company DR Colorimeter lead test which has a range of 0-150 micrograms/liter.

Examples 1 through 6 are provided to demonstrate the ineffectiveness of current state of the art adsorbents in reducing lead concentrations to 20 ppb.

EXAMPLE 1

Twenty-five cc's of a commercial organic ion exchange resin, Amberlite® DP-1, manufactured by Rohm and Haas, were contacted with a 150 ppb solution of lead nitrate in a 1¼ inch column at a flow rate of 1 liter per minute. The lead concentration in the column effluent as follows:

| Pb in Effluent, ppb | | | | |
|---|---|---|---|---|
| 5 min | 20 min | 40 min | 60 min | 90 min |
| 24 | 44 | 47 | 58 | 59 |

Although this exchange resin came close to meeting the NSF guideline (20 ppb Pb in effluent) for the first five liters of solution, it failed at every point thereafter allowing the lead concentration to rise to 50 ppb by the time 90 liters of solution had been passed through the column. Such lead concentrations are unacceptably high for safe drinking water.

EXAMPLE 2

Twenty-five cc's of a commercial organic chelating cation exchange resin, IRC-718, manufactured by Rohm and Haas were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 65 | 70 | 68 | 72 | 70 |

Unlike Amberlite DP-1, this exchange resin did not come close to meeting the NSF guideline (20 ppb Pb in effluent) in any of the effluent samples tested. By the time 90 liters of solution had passed through the column, the effluent lead concentration had reached 70 ppb. Such lead concentrations are unacceptably high for safe drinking water.

EXAMPLE 3

Twenty-five cc's of a commercial organic ion exchange resin, Aquaion TM, manufactured by Pollenex Corporation were contacted with a 150 ppb solution of lead nitrate in a 1¼ inch column at a flow rate of 1 liter per minute. The Aquaion ion exchange resin was obtained by removal from a current state of the art end of tap water filtration device (Pollenex PureWater "99" Faucet Water Filtration Cartridge). The lead concentration in the column effluent is as follows:

| Pb in Effluent, ppb | | | | |
|---|---|---|---|---|
| 5 min | 20 min | 40 min | 60 min | 90 min |
| 51 | 95 | 99 | 100 | 100 |

This Example demonstrates that the adsorbents used in current commercial end of tap filtration devices do not come close to meeting the NSF guideline of 20 ppb lead. By the time 90 liters of solution had been passed through the column, the effluent lead concentration had risen to 100 ppb. Such lead concentrations are unacceptably high for safe drinking water.

EXAMPLE 4

Activated carbon is widely utilized as an adsorbent in the purification of tap water with end of tap devices. Activated carbon manufactured from coal is hydrophilic in nature and therefore more suitable for tap water purification than activated carbon obtained from coconut shells. Carbon obtained from coconut shells being hydrophobic in nature is more suitable for use in air purification devices. Twenty-five cc's of 20/50 mesh granular activated carbon obtained from a Teledyne Water Pik IR-10 undersink water purification cartridge were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 22 | 56 | 82 | 98 | 105 |

Although this exchange resin came close to meeting the NSF guideline (20 ppb Pb in effluent) for the first 5 liters of solution, it failed at every point thereafter allowing the lead concentration to rise to 105 ppb by the time 90 liters of solution had been passed through the column. Such lead concentrations are unacceptably high for safe drinking water.

EXAMPLE 5

Twenty-five cc's of a commercial organic ion exchange resin, Brita, were obtained from a Brita carafe water purification cartridge. Although the Brita carafe purification cartridge is not a true end-of-tap device, we sought to determine whether the Brita exchange resin would perform acceptably if utilized in an end-of-tap device. Toward this end, 25 cc's of the Brita exchange resin were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 28 | 33 | 37 | 35 | 41 |

Although this exchange resin came close to meeting the NSF guideline (20 ppb Pb in effluent), for the first 5 liters of solution, it failed at every point thereafter allowing the lead concentration to rise to 41 ppb by the time 90 liters of solution had been passed through the column. Such lead concentrations are unacceptably high for safe drinking water.

EXAMPLE 6

In this Example, the efficacy of a material specifically marketed as a lead removal media for potable water applications is presented. Twenty-five cc's of a commercial inorganic ion exchange media, ABA 2000, manufactured by Selecto Inc. were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 30 | 43 | 68 | 62 | 64 |

In summary of Examples 1–6, it is clear that the current state of the art ion exchange materials have inadequate ion exchange rates to meet the NSF guidelines for lead removal under end of tap device filtration conditions. While most are effective in removing lead when given substantially longer contact times, such as would occur in the Brita carafe device, the stringent requirement of a 1.5 second contact time typical in end of tap devices proves them ineffective.

Ion exchangers demonstrate three key performance parameters: selectivity, capacity, and rate of exchange. It has long been known that amorphous inorganic metal silicate gels materials formed by precipitating hydrous metal oxides or by cogelation of certain metal salts with silica or phosphate ions results in materials which have capacity for ion exchange. Many review papers have recently been published on the inorganic exchange properties of various metal oxides and hydroxides. Such references describe in detail how metal silicate gels demonstrate significant ion exchange capacities and unique ion selectivities. However, it is generally believed that ion exchange reactions tend to be slower on metal silicate gels than many other types of ion exchangers.

"It is estimated that diffusion coefficients of simple ions through amorphous exchangers are between 10 and 20 times lower than in free aqueous solutions. They are therefore similar to organic resin exchangers." * Slow rates of ion exchange make such materials ineffective in ion exchange processes which require very rapid ion exchange rates such as, for example, the removal of lead from tap water. The instant invention has revealed that certain metal-silicate gels demonstrate high ion specificity and significant ion exchange capacity in certain ion exchange processes, such as the removal of lead from drinking water containing a preponderance of competing ionic species such as calcium.

* *Inorganic Ion Exchange Materials*, Abraham Clearfield. CRC Press, Boca Raton, Fla., 1982, p. 45.

EXAMPLES 7–16

In the Examples which follow, the unexpected properties of several metal silicate composition types with certain specific pore volumes will be prepared and tested to demonstrate the various wide variety of ion exchange rate which exists. In all such examples, freshly prepared metal and silicate solutions were used. Loss on ignition (LOI) is measured as percent weight loss after equlibrium is established at 1,000° C.

EXAMPLE 7

A titanium silicate gel having a silicon-to-titanium molar ratio of 40-1 was prepared in accordance with a conventional method of manufacture adopted from Catalysis by Paul Emmett, Vol. 1, page 341. This gel contained a 40/1 molar ratio of silica and titania and was found to possess excellent surface area and porosity.

The method of manufacture of this gel is described below:

A sodium silicate solution (solution A) is made by adding 326.56 g of "N" Brand sodium silicate to 1128.0 g of deionized water. An acidic titanium chloride solution (solution B) is made by adding 67 ml of 4N hydrochloric acid and 26.03 g titanium tetrachloride to 514 ml of deionized water. Both solutions are then cooled to 5° C. in an ice bath. Solution A is then at once rapidly added to solution B with vigorous stirring. The mixture is then poured into a tray; after complete mixing has occured, the gel time is approximately 45 seconds. When the gel has set completely, it is cut into small cubes and allowed to age undisturbed for 48 hours. The gel is then treated with 1N HCl three times for a 2-hour period and then once overnight. The gel is then washed with copious amounts of deionized water to remove all of the free chloride ions. It is then dried at 150° C. for 24 hours; after drying, the gel should be transparent.

At not time during the synthesis procedure is the gel allowed to contact any metal; polypropylene and glass labware are used throughout the preparation.

The gel produced from this method has an enormous surface area of approximately 685 $m^2g$. Once dried, the large gel particulates are placed in deionized water where rehydration swelling causes them to fracture into small particulates predominantly in the range of 20–60 mesh (hereinafter this will be referred to as autosizing). The gel is then re-dried at 80° C. for 24 hours on polypropylene trays in a drying oven and then sized to 20–60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5M $CaCl_2$ again until the pH measured above and below the sample become equivalent. The pore size distribution was measured by nitrogen desorption and found to have a near gaussian shaped pore size distribution centered at 14.18 angstroms. The cumulative desorption pore volume of this sample was found to be 0.254 cc/g.

Twenty-five cc's of this material were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 36 | 43 | 48 | 45 | 47 |

Clearly this amorphous titanium silicate ion exchanger was ineffective in reducing the lead concentration below the 20 ppb guideline for safe drinking water.

EXAMPLE 8

Amorphous Aluminosilicate

Two liters of 0.5M aluminum chloride solution (solution A) are made by adding 241.43 g $AlCl_3.6H_2O$ to enough deionized water to make 2 liters. Two liters of 0.5M sodium silicate solution (solution B) are made by dissolving 284.2 g of $Na_2SiO_3.9H_2O$ in enough 1M NaOH to make 2 liters Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14)

At no time during the synthesis procedure is the gel allowed to contact any metal; polypropylene and glass labware are used throughout the preparation.

The gel produced from this method has a silicon-to-aluminum ratio of 1:2 and a surface area of approximately 248 $m^2/g$. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5M $CaCl_2$ again until the pH measured above and below the sample become equivalent. The pore size distribution was measured by nitrogen desorption and was found to have an average pore radius of 14.64 angstroms. The cumulative desorption pore volume of this sample was found to be 0.069 cc/g.

Twenty-five cc's of this material were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 26 | 36 | 38 | 43 | 40 |

Clearly, this amorphous aluminum silicate ion exchanger was ineffective in reducing the lead concentration below the 20 ppb NSF guideline for safe drinking water.

EXAMPLE 9

Two liters of a 1.5M titanium chloride solution (solution A) ware made by adding 569.11 g $TiCl_4$ to enough deionized water to make 2 liters. Two liters of 1.5M sodium silicate solution (solution B) are made by dissolving 638.2 g of $Na_2SiO_3.5H_2O$ in enough 3M NaOH to make 2 liters Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has a silicon-to-titanium ratio of 1:1 and a surface area of approximately 433 $m^2/g$. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5 M $CaCl_2$ again until the pH measured above and below the sample become equivalent. The pore size distribution as measured by nitrogen desorption and was found to have an average pore radius of 19.67 angstroms. The cumulative desorption pore volume of this sample was found to be 0.363 cc/g.

Twenty-five cc's of this material were contacted with a 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 22 | 24 | 29 | 29 | 31 |

This amorphous titanium silicate ion exchanger was ineffective in reducing the lead concentration below the 20 ppb NSF guideline for safe drinking water. It did, however, come closer to meeting the NSF standard than the other organic and inorganic exchange media described in the previous examples.

EXAMPLE 10

Two liters of a 0.5M titanium chloride solution (solution A) are made by adding 189.71 g $TiCl_4$ to enough deionized water to make 2 liters. Two liters of 0.5M sodium silicate solution (solution B) are made by dissolving 284.2g of $Na_2SiO_3.9H_2O$ in enough 1M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has silicon-to-titanium ratio of 1:1 and a surface area of approximately 409 $m^2/g$. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20–60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5M $CaCl_2$ again until the pH measured literature on amorphous inorganic ion exchange materials which describe rates of exchange to be similar to organic ion exchange resins. It has been found that the exchange kinetics for this amorphous titanium silicate to be unexplainably rapid and much unlike the rates of exchange typical for commercial organic ion exchangers used in the industry to remove lead.

Equilibrium ion exchange isotherms were measured for Amberlite® DP-1 and the amorphous titanium silicate of this example. The procedure utilized involves adding 200 cc's of lead solution and 2 grams of ion exchange material in twelve 8 oz. polyethylene containers. The concentration of lead solution in each container is varied. The concentration of lead introduced into the twelve containers were 200, 500, 1,000, 1,500, 2,000, 2,500, 3,000, 4,000, 10,000, 20,000 and 40,000 ppm respectively. The containers were agitated on a shaker bath at room temperature and allowed to equilibrate for 24 hours. At this time, the lead concentration remaining in solution was measured by atomic adsorption. The milliequivalents of lead contained in the solution and in the ion exchanger were then calculated. The total ion exchange capacity of each material was evaluated as the concentration at which it no longer adsorbs lead from the solution even if the concentration of lead in the solution is increased. The capacities measured for DP-1 and the amorphous titanium silicate of Example 10 were equivalent and equal to 4 milliequivalents per gram. above and below the sample become equivalent. The pore size distribution was measured by nitrogen desorption and was found to have an average pore radius of 7.44 angstroms. The cumulative desorption pore volume of this sample was found to be 0.032 cc/g.

Twenty-five cc's of this material were contacted with 150 ppb solution of lead nitrate in a 1¼ inch column at a flow rate of 1 liter per minute. The lead concentrate of the column effluent is as follows:

| Pb in Effluent, ppb | | | | |
|---|---|---|---|---|
| 5 min | 20 min | 40 min | 60 min | 90 min |
| 4 | 4 | 7 | 6 | 6 |

Figure 2:
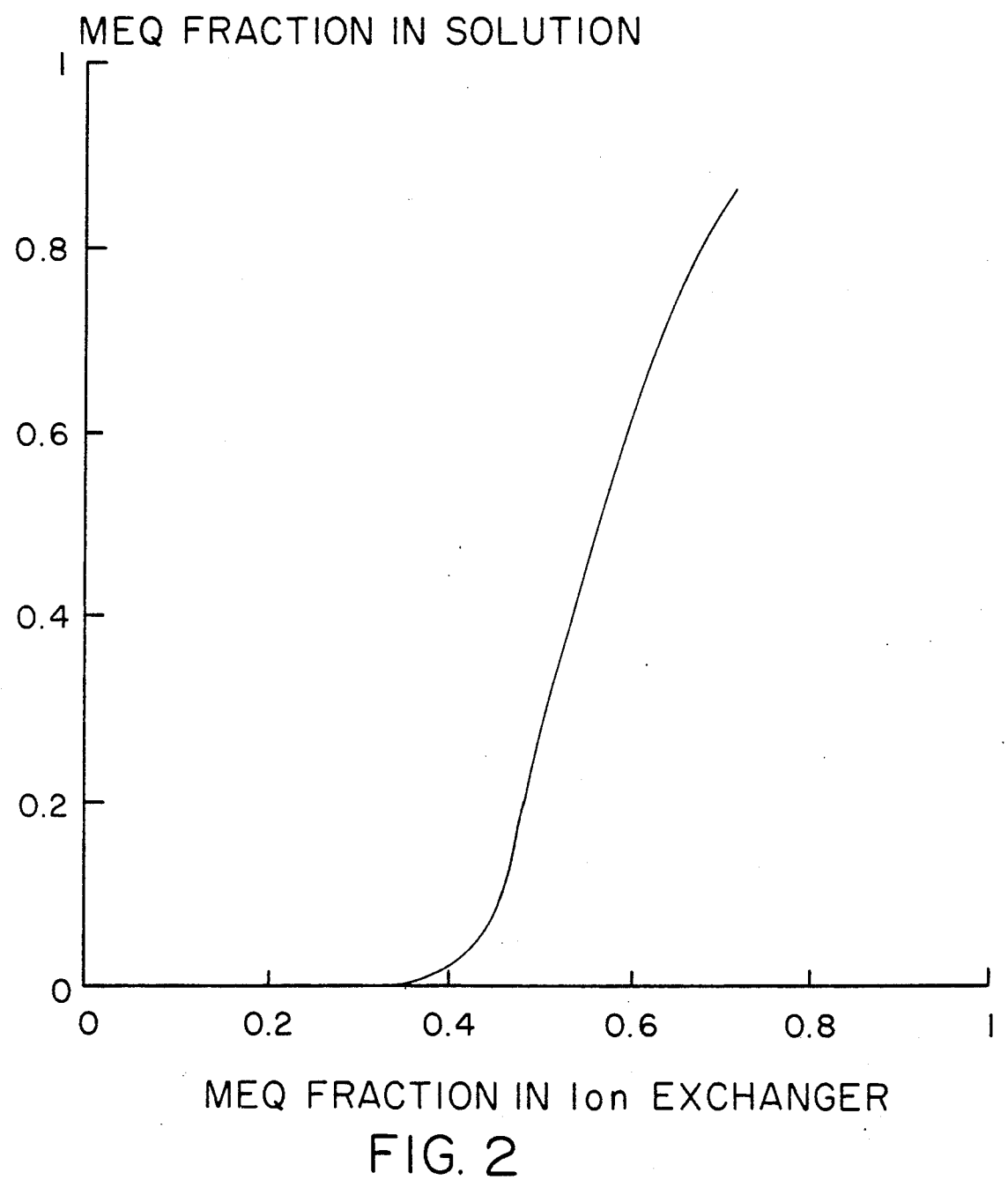
FIG. 2 is a plot showing the effective capacity for lead removal of the ion exchanger of Example 10.

Surprisingly, the gel made in the composition and by the method of this example demonstrates an unprecedented rate of ion exchange sufficient to reduce lead concentrations in tap water to within the guidelines set out by NSF. Even more surprising is that the molar silicon-to-titanium ratio for this example is the same as that of Example 9 which failed to meet said guidelines. The reason for the substantially increased rate of ion exchange for this example remains a mystery. Viewing the pore size distributions and surface areas for these examples would lead one to conclude that the gel made in accordance with the procedure outlined in Example 9 should have faster exchange kinetics for it has a significantly larger average pore size distribution, average pore volume, and greater surface area. The extremely fast kinetics of ion exchange exhibited by this amorphous titanium silicate is in disagreement of previous From the ion exchange isotherm (a plot of the percentage of total lead residing in solution versus lead residing within the ion exchange material), the effective lead capacity of both materials were evaluated. The effective capacity is defined as the percentage of the total lead capacity of the ion exchanger at the point where the ion exchanger contains less than 95% of the total lead added. This is the point at which the ion exchanger isotherm curve deviates from the x axis. The effective capacity for DP-1 as shown in the DP-1 lead isotherm, FIG. 1, is about 20% of its total capacity (4 meq/g) or about 0.8 meq/gram. The effective capacity for the amorphous titanium silicate of Example 10 as shown in the lead ion exchange isotherm, FIG. 2, is about 40% of its total ion exchange capacity (4 meq/g) or about 1.6 meq/g. Therefore, the amorphous titanium silicate of this example is superior to DP-1 for removing lead from tap water for it holds the solution lead concentration effectively at zero until twice as much lead has been adsorbed into the ion exchange material. Furthermore, the density of the amorphous titanium silicate of this example is 0.8 g/cc and that for DP-1 is 0.4 g/cc and, therefore, twice as much amorphous titanium silicate can be incorporated in a given exchange volume as can DP-1. Therefore, in a water filtration cartridge, the amorphous titanium silicate of this example has four times the effective lead capacity as the Amberlite®DP-1 exchange resin.

The superiority of the amorphous titanium silicate of this example is also evidenced under actual end-of-tap device contact times. In the 25 gallon test, DP-1 exceeds the guideline of 20 ppb of lead in the effluent even before 5 liters of 150 ppb lead were passed through the column. Using an equivalent volume of the amorphous titania silicate ion exchanger of this example, the effluent concentration of lead did not exceed the NSF 20 ppb guideline even after 450 liters of 150 ppb lead solution was passed through the column.

The rate of lead ion exchange on the sodium form amorphous titanium silicate (Example 10) and Na-DP-1 were measured in a stirred batch reactor by evaluating solution lead concentration as a function of time. From these values, the diffusivity constants were calculated. The diffusivity for the Amberlite® DP-1 exchange resin was determined to be $2.49 \times 10^{-7}$ cm$^2$/s and that for the amorphous titanium silicate of Example 10 is $3.93 \times 10^{-7}$ cm$^2$/s. The rate of lead removal as indicated by the diffusivity constant for the amorphous titanium silicate is 1.6 times faster than the DP-1 exchange resin.

The combination of greater effective exchange capacity per exchanger bed volume, faster ion exchange kinetics and selectivity for lead over competing ions typically found in tap water such as calcium and magnesium make the amorphous titania silicate of Example 10 far superior to conventional DP-1 type exchange resins for removing lead from tap water.

The literature contains many examples wherein other investigators have prepared similar amorphous titanium silicate ion exchangers for the purpose of removing metal, particularly radioactive ions, ions from aqueous solutions. Some of these publications even discuss preparing such ion exchangers using similar synthesis procedures (H. Yamazaki et al, Studies of the Hydrous Silicon (IV)-Titanium (IV) Oxide Ion Exchanger. A Method of Synthesis and Some Properties, Bulletin of the Chemical Society of Japan 62, 1837–1843 (1989)).

However, it has been discovered that extremely fast ion exchange kinetics, such as those required to remove lead from tap water using end-of-tap devices, can only be obtained when specific metal oxide compositions are manufactured. Yamazaki et al teach that "The acid-base properties of the exchangers" (referring to amorphous titanium silicate ion exchangers) "are not significantly affected by the method of mixing, nor by the concentration of solutions." (Pg. 139.) It has been found that the concentrations of the gel's precursor solutions have a pronounced effect on whether the gel exhibits super fast ion exchange kinetics. An example of this is the amorphous titanium silicate gel described in Example 9. The gel of Example 9 was prepared in precisely the same manner as the gel of this example with the exception that both solution A and solution B were three times as concentrated as those of this example. The gel obtained in Example 9 failed to hold effluent lead concentrations within the guidelines of 20 ppb after less than 5 liters of 150 ppb lead solution were passed through the column. As previously mentioned, the gel of this example held effluent lead concentrations within the guidelines even after 450 liters of 150 ppb lead solution had passed through the column. There also are significant differences in the average pore size, pore size distribution, and pore volume.

In addition to the method of preparation, the specific composition of the amorphous metal silicate determines the efficacy of the ion exchanger in removing heavy metals from tap water. It is imperative in this application that the ion exchanger be prepared such that it does not introduce other potentially more toxic metals into solution. In accordance with the recipe described in Example 10, amorphous chromium silicate, lanthanum silicate, cerium silicate, and hafnium silicate ion exchangers were prepared. Solubility tests demonstrated that these ion exchangers released potentially toxic levels of chromium lanthanum, cerium, and hafnium into solution as the pH was varied. Therefore, the requirements of this ion exchange application are more stringent than in typical industrial ion exchange processes.

EXAMPLE 11

Two liters of 1.0M titanium chloride solution (solution A) are made by adding 379.42g $TiCl_4$ to enough deionized water to make 2 liters. Two liters of 1.0M sodium silicate solution (solution B) are made by dissolving 568.40 g of $NaSiO_3.9H_2O$ in enough 1M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-4).

At no time during the synthesis procedure is the gel allowed to contact any metal; polypropylene and glass labware are used throughout the preparation.

The gel produced from this method has a titanium-to-silicon ratio of 1:1 and a surface area of approximately 475 $m^2/g$. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.5 M $CaCl_2$ again until the pH measured above and below the sample become equivalent. The pore size distribution was measured by nitrogen desorption and was found to have an average pore radius of 12.47 angstroms. The cumulative desorption pore volume of this sample was found to be 0.124 cc/g.

Twenty-five cc's of this material were contacted with a 150 ppb solution of lead nitrate in a 1¼ inch column at a flow rate of 1 liter per minute. The lead concentration of the column effluent is as follows:

| Pb in Effluent, ppb | | | | |
|---|---|---|---|---|
| 5 min | 20 min | 40 min | 60 min | 90 min |
| 10 | 13 | 14 | 15 | 17 |

As can be seen, this gel also had the same molar silicon-to-titanium ratio of Examples 9 and 10 and the performance fell in the middle. Although it passed the lead test, it was not as good as Example 10.

EXAMPLE 12

A 40-gallon batch of amorphous titanium silicate was made as follows:

Twenty gallons of 0.5M $TiOCl_2$ was prepared in a Nalgene ® container. This was done by adding 31.3 lbs. of Kemira Uniti 101 ® (16372-21-2) to 145.4 lbs. of deionized water. The Kemira assay was 21.3% $TiO_2$, 34.8% Cl.

Twenty gallons of sodium silicate solution (0.5 moles Si per liter) was prepared by first dissolving 23.34 lbs. of NaOH pellets in 142.9 lbs. of deionized water. Then 17.23 lbs. of N Clear ® sodium silicate (8.9 wt. % $Na_2O$, 28.7 wt. % $SiO_2$, balance water) was added to the caustic solution.

The caustic solution was added to the acidic titanium solution with intense agitation. The agitator was coated to prevent corrosion. The caustic solution was added at a rate of 880 ml/min.

At the end of the addition, the pH was checked and found to be 6.0. To minimize the amount of silica in the supernatant, the pH was then raised to 7.42 with an additional 16 oz. of 50% NaOH. Agitation was stopped and the mixture was aged statically. The vessel was sampled versus time.

The precipitation was essentially complete as soon as the reagents were combined based on chemical analyses of the supernatant. The pH gradually dropped to a low of about 7.17 and then appeared to rise slightly to 7.3 after 96 hours of aging. Supernatant analyses:

|  | 0 hrs. | 24 hrs. | 48 hrs. | 72 hrs. | 96 hrs. |
|---|---|---|---|---|---|
| pH | 7.42 | 7.26 | 7.17 | 7.18 | 7.30 |
| $Na_2O$ (%) | 2.88 | 2.82 | 2.9 | — | 2.82 |
| Cl (%) | 3.03 | 3.37 | 3.37 | — | 3.05 |
| $SiO_2$ (ppm) | 138 | 93 | 99 | — | 80 |
| $TiO_2$ (ppm) | 0.8 | 0.9 | 4 | — | 1.7 |

The solids which were separated from the supernatant were washed with a volume of deionized water equivalent to the filtrate volume. The solids were then dried at 80° C. overnight or until dried throughout. Upon adding the dried cake to water, the mass fractures into granules of the approximate size needed for potable water applications. The material was wet screened to remove the over and undersized material. The 20/60 mesh fractions were dried again at 80° C. The various samples were tested for lead removal efficiency. The results below are given in terms of ppb lead remaining after a 1.5 sec. contact time.

Clearly, 24 hours aging is sufficient to insure good performance. However, the poor performance of the sample aged for 96 hours suggests that a maximum aging time of 72 hours should be observed.

|  | 24 hrs. | 48 hrs. | 72 hrs. | 96 hrs. |
|---|---|---|---|---|
| 5 (min. on strm.) | 10 | 7 | 7 | 25 |
| 20 | 10 | 7 | 10 | 24 |
| 40 | 10 | 12 | 10 | 30 |
| 60 | 10 | 14 | 10 | 30 |
| 90 | 12 | 14 | 10 | 33 |

The sample aged for 72 hours had the following particle size distribution after the material was fractured.

| +20 (mesh) | 0.7 (%) |
|---|---|
| 20/32 | 20.8 |
| 32/35 | 24.5 |
| 35/48 | 27.0 |
| 48/60 | 13.9 |
| 60/80 | 6.0 |
| −80 | 7.1 |

To determine the effect of particle size on lead removal kinetics, the discrete fractions were also subjected to NSF 53 testing.

|  | 20/32 | 32/35 | 35/48 | 48/60 |
|---|---|---|---|---|
| 5 (min.) | 15 | 15 | 9 | 6 |
| 20 | 22 | 15 | 15 | 11 |
| 40 | 20 | 18 | 13 | 8 |
| 60 | 23 | 17 | 10 | 5 |
| 90 | 20 | 19 | 13 | 9 |

The drying temperature (prior to fracturing) apparently has only minimal impact on performance, although 80° C. is preferable. However, the size of the granules produced very noticeably increased with increasing drying temperature. The sample dried at 240° C. was predominantly +20 mesh after fracturing. Lead removal performance (below) was determined on screened 20/60 mesh fractions.

|  | Drying Temp. (°C.) | | |
|---|---|---|---|
|  | 80 | 120 | 240 |
| 5 (min.) | 11 | 12 | 11 |
| 20 | 10 | 13 | 11 |
| 40 | 10 | 15 | 10 |
| 60 | 10 | 13 | 11 |
| 90 | 10 | 16 | 17 |

The product aged for 72 hours was calcium exchanged by immersing in a hot (80° C.) 0.5 M $CaCl_2$ solution which had been pH adjusted to 5.5. The pH was maintained at 5.5 during addition by adding 10% $HNO_3$ dropwise as needed, and the slurry held at that pH and temperature for 20 minutes after the addition was completed. Enough dry material was added to give a 5.5% solids slurry. The slurry was filtered and the cake rinsed with an equivalent volume of deionized water. The product was dried at 80° C. The calcium exchanged titanium silicate performed similarly to the sodium form version. The same sample was heated to various temperatures to see if the performance is altered at temperatures which may be required in forming cellulose or carbon block cartridges. At 450° F. and above, there appears to be a noticeable but small loss in performance.

|  | 80° C. | 350° F. | 450° F. | 550° F. |
|---|---|---|---|---|
| 5 (min.) | 11 | 12 | 15 | 12 |
| 20 | 14 | 13 | 14 | 12 |
| 40 | 11 | 12 | 17 | 15 |
| 60 | 9 | 15 | 16 | 15 |
| 90 | 12 | 14 | 20 | 19 |

EXAMPLE 13

Other metal silicates prepared by the method of Example 10 failed to exhibit the super fast ion exchange kinetics required to hold lead concentrations below the 20 ppb limit.

Two liters of a 0.5M iron chloride solution (solution A) are made by adding 162.21g $FeCl_3$ to enough deionized water to make 2 liters. Two liters of 0.5M sodium silicate solution (solution B) are made by dissolving 212.7g of $Na_2SiO_3.5H_2O$ in enough 0.5M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has a surface area of approximately 361 $m^2$/g. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5 M $CaCl_2$ again until the pH measured above and below the sample become equivalent. The pore size distribution was measured by nitrogen desorption and was found to have an average pore radius of 15.49 angstroms. The cumulative desorption pore volume of this sample was found to be 0.212 cc/g.

Twenty-five cc's of this material were contacted with a 150 ppb solution of lead nitrate in a 1¼ inch column at a flow rate of 1 liter per minute. The lead concentration of the column effluent is as follows:

| Pb in Effluent, ppb | | | | |
|---|---|---|---|---|
| 5 min | 20 min | 40 min | 60 min | 90 min |
| 27 | 24 | 17 | 26 | 32 |

This amorphous iron silicate ion exchanger was ineffective in reducing the lead concentration below the 20 ppb NSF guideline for safe drinking water. Even though this ion exchange material was prepared using the identical metal to silica ratio and exactly the same synthesis procedure as the gel of Example 10, it failed to hold lead concentrations below the NSF limit.

EXAMPLE 14

In this example, an amorphous zirconia silicate was prepared in accordance with the procedure described in Example 10.

Two liters of a 0.5M zirconium chloride solution (solution A) are made by adding 233.03g $ZrCl_4$ to enough deionized water to make 2 liters. Two liters of 0.5M sodium silicate solution (solution B) are made by dissolving 284.2g of $Na_2SiO_3 \cdot 9H_2O$ in enough 1.0M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has a silicon-to-zirconium ratio of 1:2 and a surface area of approximately 189 $m^2/g$. Once dried, the gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10M HCl until such time that the pH measured above and below the sample become equivalent. The gel is then exchanged with 0.5M $CaCl_2$ again until the pH measured above and below the sample become equivalent. The pore size distribution was measured by nitrogen desorption and was found to have an average pore radius of 9.97 angstroms. The cumulative desorption pore volume of this sample was found to be 0.012 cc/g.

Twenty-five cc's of this material were contacted with 150 ppb solution of lead nitrate in a 1¼ inch column at a flow rate of 1 liter per minute. The lead concentration of the column effluent is as follows:

| Pb in Effluent, ppb | | | | |
|---|---|---|---|---|
| 5 min | 20 min | 40 min | 60 min | 90 min |
| 14 | 17 | 20 | 22 | 24 |

Although marginally effective, this amorphous zirconium silicate ion exchanger failed to reduce the lead concentration below ppb NSF guidelines for safe drinking water. Even though this ion exchange material was prepared using the identical metal to silica ratio and exactly the same synthesis procedure as the gel of Example 10, it failed to hold lead concentrations below the 20 ppb limit. Although the first 40 liters passed through the column had lead concentrations within acceptable limits, this does not represent an effective lifetime for the ion exchange media. Breakthrough occurring this early on stream would require much too frequent change out of the exchange media in the end-of-tap device.

In addition to titanium, two other metal silicates prepared in accordance with the procedure outlined in Example 10 were found to exhibit the degree of super fast ion exchange kinetics required for application in an end-of-tap filtration device.

Examples 15 and 16 demonstrate the efficacy of these materials in removing lead from tap water.

EXAMPLE 15

In this example, an amorphous niobium silicate was prepared in accordance with the procedure described in Example 10.

Two liters of a 0.5M niobium chloride solution (solution A) are made by adding 270.17g $NbCl_5$ to enough deionized water to make 2 liters. Two liters of 0.5M sodium silicate solution (solution B) are made by dissolving 284.2g of $Na_2SiO_3 \cdot 9H_2O$ in enough 1.5M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has a silicon-to-niobium ratio of 1:1 and a surface area of approximately 55 $m^2/g$. Once dried, the gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10 M HCl until such time that the pH measured above and below the sample become equivalent. The gel is then exchanged with 0.5 M $CaCl_2$ again until the pH measured above and below the sample become equivalent. The pore size distribution could not be determined by nitrogen desorption.

Twenty-five cc's of this material were contacted with 150 ppb solution of lead nitrate in a 1¼ inch column at a flow rate of 1 liter per minute. The lead concentration of the column effluent is as follows:

| Pb in Effluent, ppb | | | | |
|---|---|---|---|---|
| 5 min | 20 min | 40 min | 60 min | 90 min |
| 12 | 12 | 14 | 14 | 15 |

This niobium silicate prepared by the method of Example 10 possesses the super fast ion exchange kinetics necessary for application in an end-of-tap water filtration device. Its ability to reduce lead concentrations from 150 ppb to well below 20 ppb is demonstrated in the above listed values.

EXAMPLE 16

In this example, an amorphous tin silicate was prepared in accordance with procedure described in Example 10.

Two liters of a 0.5M tin chloride solution (solution A) are made by adding 260.5g $SnCl_4$ to enough deionized water to make 2 liters. Two liters of 0.5M sodium silicate solution (solution B) are made by dissolving 284.2g of $Na_2SiO_3.9H_2O$ in enough 1.0M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age 2-4 days. After aging, any water on top of the gel is decanted off. The sample is then filtered, washed with 1 liter deionized water per liter of gel, reslurried in 4-6 liters of deionized water, filtered, and finally rewashed in 2 liters of water per liter of gel. The sample is then dried at 70° C. for 24-48 hours (until LOI is 10-14).

At no time during the synthesis procedure is the gel allowed to contact any metal; polypropylene and glass labware are used throughout the preparation.

The gel produced from this method has a silicon-to-tin molar ratio of 1:2 and a surface area of approximately 232 $m^2/g$. Once dried, the large gel particulates are placed in deionized water where rehydration swelling causes them to fracture into small particulates predominantly in the range of 20-60 mesh. The gel is then re-dried at 80° C. for 24 hours on polypropylene trays in a drying oven and then sized to 20-60 mesh for kinetic testing. The gel is then placed in an ion exchange column having pH electrodes at the inlet and outlet. The gel is then exchanged with 0.10 M HCl until such time that the pH measured above and below the sample become equivalent. The gel is then exchanged with 0.5 M $CaCl_2$ again until the pH measured above and below the sample become equivalent. The pore size distribution was measured by nitrogen desorption and was found to have an average pore radius of 11.44 angstroms. The cumulative desorption pore volume of this sample was found to be 0.045 cc/g.

Twenty-five cc's of this material were contacted with 150 ppb solution of lead nitrate in a 1¼ inch column at a flow rate of 1 liter per minute. The lead concentration in the column effluent is as follows:

| Pb in Effluent, ppb | | | | |
|---|---|---|---|---|
| 5 min | 20 min | 40 min | 60 min | 90 min |
| 6 | 12 | 12 | 14 | 12 |

This tin silicate prepared by the method of Example 10 possesses the super fast ion exchange kinetics necessary for application in an end-of-tap water filtration device. Its ability to reduce lead concentrations from 150 ppb to well below 20 ppb is demonstrated in the above listed values.

As can be seen from the above examples, the only gels which pass the lead removal test were titanium silicate gels, tin silicate gels and niobium silicate gels. However, as indicated earlier, rapid lead removal is only one feature to be considered in determining whether or not an ion exchanger is suitable for treatment of drinking water. Quite obviously, if the exchanger did not pass the lead test, then it would not be useful. The reverse is not true, however, since an important characteristic of an ion exchanger is its capacity. In other words, it is of extreme importance that an ion exchanger have sufficient capacity that it be able to function in an effective manner over a reasonably long period of time and, preferably, so that its total effective life is longer than the activated charcoal which is usually contained in such devices.

In order to determine whether or not the titanium silicates, the tin silicates and the niobium silicates had sufficient capacity, the following additional test was carried out.

A solution containing $5.658 \times 10^{-5}$ meq/cc each of chromium, copper, cadmium, lead, nickel, zinc and mercury is made by making a stock solution consisting of 7.456 g $Cr(NO_3)_3.9H_2O$, 6.577 g $Cu(NO_3)_2.5H_2O$, 8.726 g $Cd(NO_3)_2.4H_2O$, 9.366 g $Pb(NO_3)_2$, 8.224 g $Ni(NO3)2.6H_2O$, 8.413 g $Zn(NO3)2.6H_2O$ and 7.674 g $HgCl_2$ in 1 liter of deionized water, and then diluting 1 cc of the stock solution to 1 liter.

The $-20/+60$ calcium form of the ion exchange material is measured out to 9.1 cc in a graduated cylinder and then weighed. The sample is then carefully loaded into a 30 cm×1 cm glass chromatography column that has been filled with deionized water, being especially careful to avoid trapping air within the bed. A peristaltic pump is used to regulate the liquid flow. Using deionized water, the flow through the bed is set at 8.34 cc/min.

Effluent samples are collected periodically using a Wilson model 203 Micro Fraction Collector. The effluent samples, along with a sample of the starting solution, are analyzed by inductively coupled argon plasma spectroscopy (ICP) for ppm concentrations of the metals.

In Table 1, the data from this seven-metal toxic cocktail test is used to estimate which metal silicates exhibit aging and selectivity properties best suited to tap water purification utilization.

The first section of Table 1 lists a percent removed value for four heavy metals. These numbers were obtained using values obtained from the NSF Standard Number 53, page 10, Table 1—Chemical Reduction Requirements. The NSF table gives an influent challenge value and a maximum effluent concentration for lead, cadmium, chromium and mercury. The required extent of metal removal expressed as percent removed was evaluated as follows:

| Pb in Effluent, ppb | | | | |
|---|---|---|---|---|
| 5 min | 20 min | 40 min | 60 min | 90 min |
| 6 | 12 | 12 | 14 | 12 |

In other words, for lead, given an influent challenge of 0.15mg/1, and a maximum acceptable effluent concentration of 0.020mg/1, it will be necessary for the ion exchange material to adsorb 86.7% of the lead entering as influent. The required extent of removal for lead, cadmium, chromium and mercury are given in the top of Table 1. Sample aliquots in the seven-metal toxic cocktail test were taken after multiple times on stream and the concentration of each of the seven metals were measured using inductively coupled argon plasma spectroscopy. For each sampling time, the fraction of the total influent metal exposed to the bed which breaks through the bed was evaluated (as percent adsorbed). The required percent removed was then compared to the actual measured weight percent absorbed for each heavy metal and for each sampling time. A sample was considered to "pass" the NSF standard at a specific sampling time provided its weight percent absorbed exceeded required percent removed calculated from the NSF table. At the point in sampling time that weight percent absorbed fell below the required percent removed, the sample was considered to have failed. The aliquot previous to the sample which failed was then considered to be the last point at which the ion exchanger passed the test for that heavy metal. The number of liters of solution successfully processed by the ion exchanger up to the point of failure, for each ion exchanger, is shown in Table 1 (as the # of L that pass NSF standard).

The seven-metal toxic cocktail test is an accelerated aging test which employs a metal solution containing 1,000 times the concentration of metals which would be expected to occur in tap water. The solution used in this test contained ppm concentrations of each of the heavy metals to facilitate capacity measurement within a reasonable time frame and by processing a reasonable total amount of process fluid. Real tap water typically contains ppb concentrations of heavy metals. To estimate the volume of actual tap water which would be purified by a particular gel, the number of liters that pass the NSF standard were multiplied by 1,000 to convert from ppm to ppb concentrations (column 2). These values were then converted from liters to gallons (column 3). A typical under-the-sink water purification cartridge has an approximate lifetime of 2,000 gallons; therefore, a sample must exceed the NSF guideline for over 2,000 gallons in order to pass the test. A 100% safety factor was then added (column 4).

TABLE 1

Toxic Cocktail Test
Accelerated Aging/Selectivity Determination
NSF Standard 53 Chemical Reduction Requirements

| Metal: | Influent Challenge (mg/L) | Maximum Effluent Concentration (mg/L) | Percent Removed |
|---|---|---|---|
| Lead | 0.15 | 0.020 | 86.7 |
| Cadmium | 0.03 | 0.005 | 83.3 |
| Chromium | 0.15 | 0.050 | 66.7 |
| Mercury | 0.006 | 0.002 | 66.7 |

| Metal: | # of L That Pass Pass NSF Standard | Convert ppm to ppb | Convert to gallons* | With 100% Safety Factor |
|---|---|---|---|---|

TABLE 1-continued

| | Niobium Silicate | | | |
|---|---|---|---|---|
| Lead | 16.68 | 16,680 | 4406/passes | 2203/passes |
| Cadmium | 2.78 | 2,780 | 734/fails | 367/fails |
| Chromium | 2.78 | 2,780 | 734/fails | 367/fails |
| Mercury | 8.34 | 8,340 | 2203/passes | 1102/fails |
| | Tin Silicate | | | |
| Lead | 32.48 | 32,480 | 8580/passes | 4290/passes |
| Cadmium | 26.57 | 26,570 | 7019/passes | 3510/passes |
| Chromium | 32.48 | 32,480 | 8580/passes | 4290/passes |
| Mercury | 26.57 | 26,570 | 7019/passes | 3510/passes |
| | Titanium Silicate | | | |
| Lead | 29.52 | 29,500 | 7798/passes | 3899/passes |
| Cadmium | 20.67 | 20,670 | 5460/passes | 2730/passes |
| Chromium | 32.48 | 32,480 | 8580/passes | 4290/passes |
| Mercury | 20.67 | 20,670 | 5460/passes | 2730/passes |

*Typical under-the-sink water cartridge has a lifetime of approximately 2,000 gallons; therefore, a sample must exceed the NSF guideline for over 2,000 to pass test.

As can be observed from the data in Table 1, after employing a 100% safety factor, the niobium silicate only passes for lead. Both the tin and titanium silicates easily pass the NSF standards even with the added safety factor.

APPENDIX

The cumulative pore volume of the ion exchange materials were evaluated after first pretreating the exchange materials at 250° C. for at least 6 hours in a vacuum wherein the total pressure was less than 20 torr. The total pore volume for all pores having radii between 12.5 and 300 angstrom units were evaluated from the equilibrium nitrogen desorption isotherm which was measured on a Quantachrome Autosorb-6 at the related pressure (P/Po) values listed below wherein P is pressure (torr) after equilibrium during desorption and Po is liquid nitrogen vapor pressure (torr).

Using the method of Barrett el J.A.C.S., Vol. 73, 1951, pp 373-380, and simplified in ASTM designation D4641-87, section 6, computational procedure, the cumulative pore volumes in cubic centimeters per gram were evaluated for each radius interval shown below. The total cumulative desorption pore volume for all pores having radii between 12.5 and 300 angstrom units were calculated by summing the incremental pore volumes for each radius interval shown.

TABLE

| Relative Pressure Points | | Pore Radius Range |  |
|---|---|---|---|
| Point # | P/Po | Angstroms | |
| 1 | 0.080 | 300.0— | 250.0 |
| 2 | 0.110 | 250.0— | 225.0 |
| 3 | 0.140 | 225.0— | 200.0 |
| 4 | 0.170 | 200.0— | 175.0 |
| 5 | 0.200 | 175.0— | 150.0 |
| 6 | 0.300 | 150.0— | 140.0 |
| 7 | 0.995 | 140.0— | 130.0 |
| 8 | 0.992 | 130.0— | 120.0 |
| 9 | 0.988 | 120.0— | 110.0 |
| 10 | 0.984 | 110.0— | 100.0 |
| 11 | 0.980 | 100.0— | 90.0 |
| 12 | 0.974 | 90.0— | 80.0 |
| 13 | 0.967 | 80.0— | 75.0 |
| 14 | 0.954 | 75.0— | 70.0 |
| 15 | 0.940 | 70.0— | 65.0 |
| 16 | 0.924 | 65.0— | 60.0 |
| 17 | 0.907 | 60.0— | 55.0 |
| 18 | 0.888 | 55.0— | 50.0 |
| 19 | 0.867 | 50.0— | 47.5 |
| 20 | 0.845 | 47.5— | 45.0 |
| 21 | 0.820 | 45.0— | 42.5 |
| 22 | 0.794 | 42.5— | 40.0 |
| 23 | 0.765 | 40.0— | 37.5 |

TABLE-continued

| Relative Pressure Points | | Pore Radius Range |
| --- | --- | --- |
| Point # | P/Po | Angstroms |
| 24 | 0.734 | 37.5— 35.0 |
| 25 | 0.700 | 35.0— 32.5 |
| 26 | 0.665 | 32.5— 30.0 |
| 27 | 0.627 | 30.0— 27.5 |
| 28 | 0.588 | 27.5— 25.0 |
| 29 | 0.546 | 25.0— 22.5 |
| 30 | 0.503 | 22.5— 20.0 |
| 31 | 0.459 | 20.0— 17.5 |
| 32 | 0.415 | 17.5— 15.0 |
| 33 | 0.370 | 15.0— 12.5 |
| 34 | 0.325 | |
| 35 | 0.281 | |
| 36 | 0.240 | |
| 37 | 0.200 | |
| 38 | 0.170 | |
| 39 | 0.140 | |

What is claimed is:

1. A process for the removal of heavy metals from aqueous solutions thereof containing one or more of said heavy metals as well as competing ions including calcium and/or magnesium which comprises contacting said aqueous solution with amorphous gels selected from the group consisting of titanium silicates and tin silicates having a molar ratio of silicon-to-titanium or tin of from 1:4 to 1.9:1 and having a desorption pore volume of from about 0.03 to about 0.25 cubic centimeters per gram, until such heavy metals are substantially removed from said aqueous solution.

2. The process of claim 1 wherein said amorphous gel is titanium silicate.

3. The process of claim 2 wherein said heavy metals are selected from the group consisting of lead, cadmium, zinc, chromium, arsenic and mercury.

4. The process of claim 1 wherein said amorphous gel is tin silicate.

5. The process of claim 4 wherein said heavy metals are selected from the group consisting of lead, cadmium, zinc, chromium, arsenic and mercury.

6. A process for the removal of heavy metals from aqueous solutions thereof containing one or more of said heavy metals as well as competing ions including calcium and/or magnesium which comprises contacting said aqueous solution with an amorphous titanium silicate or tin silicate gel having a desorption pore volume of from about 0.03 to about 0.25 cubic centimeters per gram, prepared by reacting a sodium silicate solution having a concentration of between 0.05 and 1.4 molar with a 0.3–3.5 molar solution of a titanium or tin salt at a pH of from about 4 to 9 to form said amorphous gel, aging said gel, washing and drying the same and continuing said contact with said aqueous solution of heavy metals until such heavy metals are substantially removed from said aqueous solution.

7. The process of claim 6 wherein said pH is from 7 to 8.

8. The process of claim 7 wherein the gel is aged for around 24 hours to no longer than 96 hours.

9. The process of claim 8 wherein said amorphous gel is titanium silicate.

10. The process of claim 8 wherein said amorphous gel is tin silicate.

* * * * *